US008020587B2

(12) United States Patent
Gray, Jr.

(10) Patent No.: US 8,020,587 B2
(45) Date of Patent: Sep. 20, 2011

(54) PISTON-IN SLEEVE HYDRAULIC PRESSURE ACCUMULATOR

(75) Inventor: Charles L. Gray, Jr., Pinckney, MI (US)

(73) Assignee: The United States of America as represented by the Administrator of the U.S. Environmental Protection Agency, Washington, DC (US)

( * ) Notice: Subject to any disclaimer, the term of this patent is extended or adjusted under 35 U.S.C. 154(b) by 683 days.

(21) Appl. No.: 12/156,734

(22) Filed: Jun. 4, 2008

(65) Prior Publication Data

US 2008/0314467 A1 Dec. 25, 2008

Related U.S. Application Data

(60) Provisional application No. 60/934,037, filed on Jun. 11, 2007.

(51) Int. Cl.
*F16L 55/04* (2006.01)

(52) U.S. Cl. .......................................................... 138/31

(58) Field of Classification Search ...................... 138/31
See application file for complete search history.

(56) References Cited

U.S. PATENT DOCUMENTS

| | | | | | |
|---|---|---|---|---|---|
| 2,417,873 | A * | 3/1947 | Huber | 138/31 |
| 2,715,419 | A * | 8/1955 | Ford et al. | 138/31 |
| 2,742,929 | A * | 4/1956 | Treseder | 138/31 |
| 2,817,361 | A * | 12/1957 | Mercier | 138/31 |
| 2,829,672 | A * | 4/1958 | Bleasdale | 138/31 |
| 3,004,561 | A * | 10/1961 | Henry | 138/31 |
| 4,243,856 | A * | 1/1981 | Gratzmuller | 200/81.5 |
| 4,566,609 | A * | 1/1986 | Hoffmeister | 222/130 |
| 4,769,990 | A * | 9/1988 | Bach et al. | 60/416 |
| 4,799,048 | A * | 1/1989 | Goshima et al. | 340/626 |
| 5,354,187 | A * | 10/1994 | Holland et al. | 417/540 |
| 5,520,053 | A * | 5/1996 | Weber et al. | 73/628 |
| 7,108,016 | B2 * | 9/2006 | Moskalik et al. | 138/31 |
| 7,234,490 | B2 * | 6/2007 | Dorr | 138/31 |
| 7,661,442 | B2 * | 2/2010 | O'Brien et al. | 138/31 |
| 7,770,599 | B2 * | 8/2010 | Ota et al. | 138/31 |
| 2004/0020201 | A1 * | 2/2004 | Feigel et al. | 60/534 |
| 2006/0130920 | A1 * | 6/2006 | Baltes | 138/31 |

* cited by examiner

*Primary Examiner* — James Hook
(74) *Attorney, Agent, or Firm* — David H. Read

(57) ABSTRACT

A piston-in-sleeve accumulator includes a cleaning element positioned on the piston and configured to remove and prevent debris from lodging between the piston and a cylindrical nonpermeable sleeve within which the piston slides. A seal on the piston is positioned to engage an opposing surface in the event of a leak, and thereby prevent the possibility of a complete drainage of pressurized fluid from occurring through the accumulator's fluid port. A position contactor switch is further provided to signal position of the piston within the accumulator.

2 Claims, 3 Drawing Sheets

PISTON-IN SLEEVE HYDRAULIC PRESSURE ACCUMULATOR

This application claims priority from U.S. provisional application 60/934,037, "Piston-in-Sleeve Hydraulic Pressure Accumulator," filed Jun. 11, 2007.

FIELD OF THE INVENTION

This invention relates to high pressure accumulators of the piston-in-sleeve (or "piston and sleeve") type.

DESCRIPTION OF THE RELATED ART

Commonly-assigned U.S. Pat. No. 7,108,016, which is incorporated herein by reference, discloses a piston-in-sleeve high pressure accumulator. For application of such accumulators as energy storage devices in hydraulic hybrid motor vehicles, it is desired that the accumulators be able to last millions of charging and discharging cycles without need for repair. Precautions against fluid leakage, and preventing the presence of damaging debris in critical areas within the accumulator, are therefore desirable in order to obtain good durability and reliability of such accumulators.

SUMMARY OF THE INVENTION

One object of the present invention is to reduce the possibility of damage to the internal sleeve of a piston-in-sleeve accumulator by debris within the accumulator.

Another object of the present invention is to reduce possible damage that could occur from an unanticipated loss of working fluid from the interstitial space between the sleeve and vessel wall of a piston-in-sleeve accumulator.

DETAILED DESCRIPTION OF THE INVENTION

Figure 1:
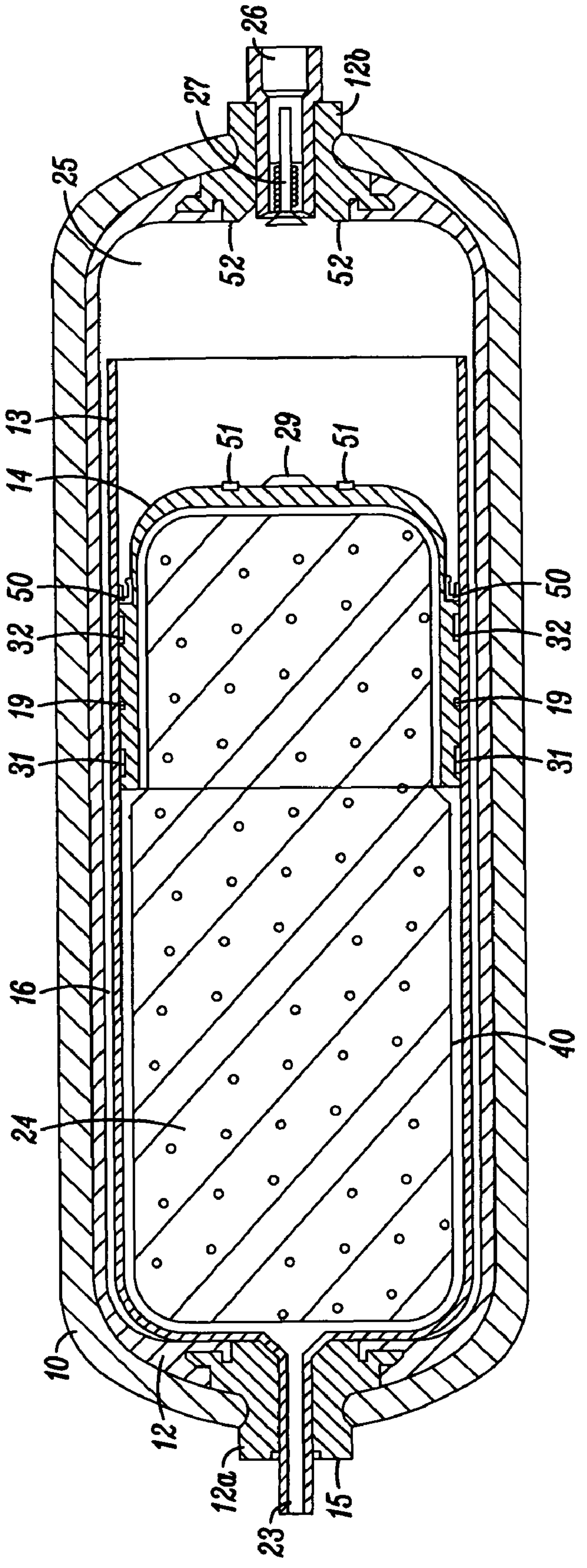
FIG. 1 shows a cross-sectional view of a piston-in-sleeve accumulator according to a preferred embodiment of the invention.

With reference to FIG. 1, depicting a high pressure piston-in-sleeve hydraulic accumulator according to a preferred embodiment of the invention, a lightweight composite cylindrical outer pressure vessel 10 with rounded ends is presented. Suitable materials for vessel 10 comprise carbon fiber wrap, E-glass, or one of many other strong and lightweight materials, such as may be found for high pressure bladder accumulators of the prior art. Suitable materials for vessel 10, may include materials that are gas-permeable at high pressures (e.g., 5000 psi or 7000 psi). Sample vessel volumes for hydraulic hybrid vehicle energy storage application range from 8 gallons to 54 gallons, but can vary as needed. Vessel 10 is preferably lined with a thin cylindrical liner 12 made of fatigue-resistant plastic, but may also be made of HDPE or other suitable material, as will also be understood in the art. Metal end bosses **12*a* and 12*b* reside at the ends of the vessel 10 to provide access to the interior of the vessel and are preferably embedded within liner 12, if liner 12** is provided.

Non-permeable cylindrical sleeve unit 13 resides within vessel 10 (and liner 12 if provided), and is thin relative to the wall of pressure vessel 10. Sleeve unit 13 is preferably welded to metal end boss **12*a* by means of a weld joint such as that depicted in the position of weld 15, or at a similar location such as at other points on the interior of metal end boss 12*a***. Other joining means (for example, a threaded connection with an appropriate sealing means) may alternatively be employed.

Charge gas port 23 communicates with inner working medium chamber 24. Hydraulic fluid port 26 communicates with outer working medium chamber 25, which includes interstitial volume 16 between sleeve 13 and liner 12 (or if no liner, between sleeve 13 and cylinder wall 10). Shutoff valve 27 resides in port 26 and acts to close port 26 as the fluid volume approaches zero. Piston 14 is slidably contained within sleeve 13. The inner working medium chamber 24 formed by piston 14 and sleeve 13 is filled with charge gas at a pressure typical of the art. Chamber 24 may also contain foam 40 to avoid heat increase in chamber 24 as the charge gas is compressed, as will be understood in the art. The addition of foam in chamber 24 may also be utilized to provide structural support for sleeve 13. Outer chamber 25 is filled with hydraulic fluid.

As hydraulic fluid enters and exits via port 26, piston 14 will move longitudinally within sleeve 13 in reaction to forces resulting from the balancing of pressure between the gas in chamber 24 and the fluid in chamber 25. Charge gas is prevented from contacting the fluid by means of the piston 14 and one or more piston seals 19. Slider bearings 31 and 32 preferably encircle piston 14 and act to facilitate the piston's longitudinal movement within sleeve 13.

The accumulator of the present invention is prepared for operation by introducing fluid working medium into chamber 25 through fluid port 26 so as to cause interstitial space 16 and chamber 25 (which may be larger or smaller than depicted depending on the position of piston 14) to fill entirely with fluid to the exclusion of any residual gases that may be present from manufacturing and assembly. A charge gas such as nitrogen is then introduced through gas charge port 23 at a designated pre-charge pressure, perhaps for example 1000 psi. The pressure of the initial gas charge will cause piston 14 to move longitudinally toward the opposite end of the vessel, expelling fluid from chamber 25 as the piston sweeps through it. Valve bumper 29, either an elastomer or a spring means (e.g., a coil spring) will eventually exert pressure on shutoff valve stem 27 causing fluid port 26 to close and fluid to cease exiting. Fluid will continue to be present in interstitial space 16 and represents a volume of non-working fluid that will preferably always be present in this space. To retain the charge gas, charge port 23 is sealed by conventional gas valve means as is known in the art. In this manner the accumulator is brought to its proper pre-charge pressure. To store energy in the accumulator, fluid is pumped into chamber 25 through valve port 26 by a hydraulic pump/motor or other means, which causes charge gas in chamber 24 to become compressed as fluid causes piston 14 to move into it, as is known in the art.

Figure 2:
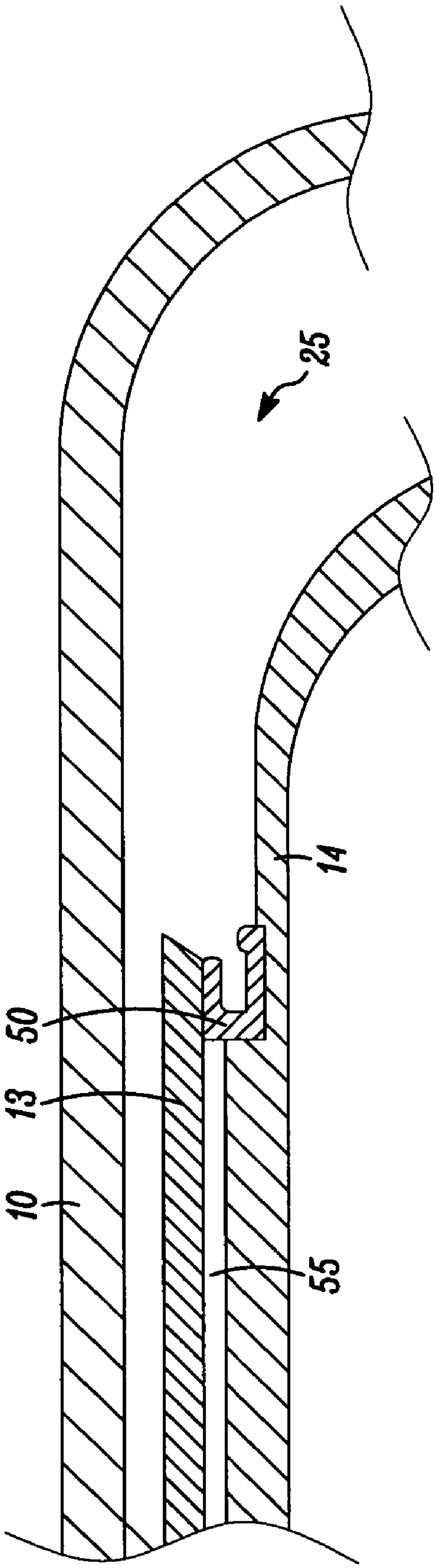
FIG. 2 shows a cleaning element for a piston-in-sleeve accumulator according to a preferred embodiment of the invention.

As more clearly depicted in FIG. 2, focusing on the piston 14's positioning within sleeve 13, it may be seen that one improvement in the present invention is that a wiper or cleaning element 50 is positioned on the piston 14 adjacent to sleeve 13, with the cleaning element 50 positioned on a leading edge between the piston 14 and sleeve 13 on the oil chamber 25's side of the piston to remove and prevent any debris in the oil in chamber 25 from lodging in the space 55 between the piston 14 and the cylindrical nonpermeable sleeve 13. Cleaning element 50 preferably extends perpendicularly slightly from the outer annular surface of piston 14 toward the sleeve 13 for improved cleaning effect. It will be understood that the particular design of wiper 50 shown in FIG. 2 is just one of various possible designs for cleaning element 50. Applicant has found that without a cleaning element 50, debris in the working fluid can lodge in the space 55 and scratch sealing surfaces of sleeve 13 such that the piston no longer retains charge gas. The cleaning element 50 may be made of a deformable material such as rubber (but could also be metal), and preferably acts as a wiper to clear debris from the sleeve 13 that could otherwise lodge between sleeve 13 and piston 14 and thereby damage the sleeve 13 and impair the durability or function of the accumulator.

While an alternative remedy for handling such debris for some prior art piston-in-sleeve accumulators could be to remove the piston and sleeve from the accumulator as needed for cleaning or repair, such a solution would presumably require that at least one of the ends of the accumulator vessel body be detachable in order to facilitate the piston and sleeve removal. This would require a vessel body of greater cost and/or weight than the composite vessel body 10 used in applicant's invention.

As a further improvement, embedded seal or seals 51 may additionally be placed on the piston 14, as shown in FIG. 1, positioned to engage an opposing surface (such as interior wall surface 52 of liner 12) in the event of a loss of fluid through the shut-off valve 27 and the accumulator's fluid port 26 beyond a desirable maximum threshold. The contact between the seal(s) 51 and surface 52 of liner 12 would thereby prevent complete drainage of the pressurized fluid from the interstitial volume 16 through the fluid port 26. Complete drainage of the pressurized fluid from the intervening volume 16 should be avoided with the accumulator of the present invention, as such could cause deformation of the sleeve 13 and thereby impair the durability and usefulness of the accumulator. Such a loss of too much fluid could occur, for example, in the event of a leak from the accumulator through the port 26, such as in the event of a failure of shut-off valve 27 to successfully shut off fluid flow.

Figure 3:
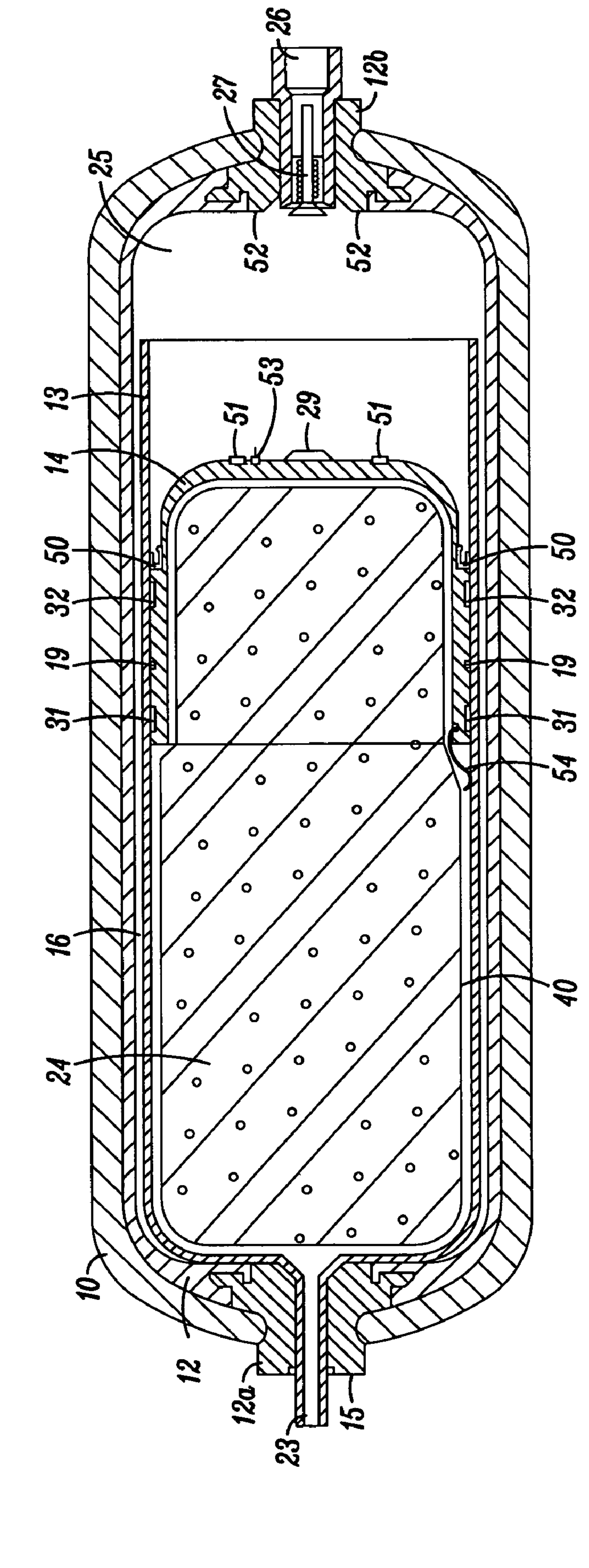
FIG. 3 shows a cross-sectional view of a piston-in-sleeve accumulator according to an alternative embodiment of the invention with a piston position sensor arrangement.

In the piston accumulator embodiment of FIG. 3, a mechanism for detecting a position of piston 14 within the accumulator is also provided. In one embodiment, a metal contact element 53 extends from piston 14 such that element 53 contacts metal end boss 12*b* as piston 14 approaches end boss 12*b*. Electrically conductive contact element 53 could be a coil spring, for example. Electrically conductive contact element 54 further connects metal piston 14 with metal sleeve 13, which is connected at its base to metal end boss 12*a*. Contact element 54 is preferably a sliding spring. As a result, the contact of element 53 with metal end boss 12*b* creates continuity from metal end boss 12*b* to metal end boss 12*a* that may be used to complete an electrical circuit and provide an electrical signal to a control unit (not shown) indicating the piston position. In this manner, contact element 53 and contact element 54 provide a continuity contact sensor/switch to signal piston 14's position as desired, for useful control of the accumulator's operation, for example to allow the control unit to prevent an undesired accumulator shut-off.

While particularly useful for high pressure accumulators for the reasons as discussed above, it will also be understood that the device of the present invention may be used for other purposes as well, including, for example, as a lower pressure accumulator for a wide variety of applications.

From the foregoing it will also be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A hydraulic pressure accumulator, comprising:

a vessel body, comprising a cylindrical vessel wall;

a closeable fluid port positioned within one end of the vessel body, for communication with fluid sources external to the hydraulic pressure accumulator;

a cylindrical nonpermeable sleeve, disposed within the vessel body and substantially concentric with the cylindrical vessel wall;

a piston slidably disposed within the cylindrical nonpermeable sleeve, separating the interior of said sleeve into a first chamber, containing a gas adapted to be compressed under pressure, and a second chamber, containing pressurized fluid in fluid communication with the closeable fluid port and with an intervening volume containing fluid between the cylindrical nonpermeable sleeve and the cylindrical vessel wall; and a seal on one end of the piston positioned to engage an opposing surface in the event of a leak of pressurized fluid from the accumulator through the closeable fluid port, thereby preventing complete drainage of the pressurized fluid from the intervening volume through the closeable fluid port.

2. The hydraulic pressure accumulator of claim 1, further comprising a cleaning element positioned on a leading edge of the piston, adjacent to the nonpermeable sleeve, configured to prevent debris from lodging between the piston and the cylindrical nonpermeable sleeve.

* * * * *